May 28, 1957  J. W. CARVER, JR  2,793,908

REMOTE CONTROL IRRIGATION SYSTEM AND VALVE

Filed March 30, 1956

INVENTOR.
JAMES W. CARVER JR.
BY
Buckhorn and Cheatham
ATTORNEYS

United States Patent Office 2,793,908
Patented May 28, 1957

2,793,908

REMOTE CONTROL IRRIGATION SYSTEM AND VALVE

James W. Carver, Jr., Salem, Oreg., assignor to R. H. Pierce Manufacturing Company, Eugene, Oreg., a corporation of Oregon Application March 30, 1956, Serial No. 575,033

9 Claims. (Cl. 299—27)

This invention relates to a remote control irrigation system and valve employed therein, and more particularly to a system containing a number of valves each associated with a sprinkler head in which repeated stopping and starting of the supply of water under pressure to the system will cause successive operation of selected groups of the sprinkler heads in a definite repeating cycle and in which the sprinkler heads in each group are distributed over the area to be irrigated in a manner enabling much smaller pipes to be employed than found necessary in prior systems.

Large scale irrigation systems employing lightweight metal pipes with sprinkler heads distributed along such pipes have been permanently installed in certain portions of the country. Such systems have ordinarily included a source of water under pressure, such as a centrifugal pump drawing water from a stream or a well, supplying water to a main distribution pipe to which a plurality of secondary distribution pipes or laterals are connected. In such systems, all of the sprinkler heads on one or a few of the secondary distribution pipes have been operated simultaneously. Manually operable valves have been employed in each secondary distribution pipe adjacent its junction with the main distribution pipe and the entire irrigation system has been controlled manually, it being merely necessary for the operator to walk along the main distribution pipe. Such a system requires that the secondary distribution pipe adjacent the main distribution pipe be of sufficient size to carry all of the water required for all of the sprinkler heads on such secondary distribution pipe and also require that the main distribution pipe be of substantial size throughout its entire length.

In accordance with the present invention, each of the sprinkler heads has a remotely controlled valve between such sprinkler head and its connection to a secondary distribution pipe or lateral. The valves are controlled so as to progress through a definite cycle having a plurality of steps therein by repeatedly stopping and starting the supply of water under pressure to the system. Each time the water pressure is lowered throughout the system and then again raised, each of the valves progresses one step in the cycle and at one step only in the cycle of each valve, the valve is opened to cause operation of its associated sprinkler head. By presetting the valves so that one or at most a small number of sprinkler heads on each secondary distribution pipe as compared to the total number of sprinkler heads on such pipe is operated at any one time, the size of the laterals may be reduced so as to be of a size to supply water to only such small number of sprinkler heads instead of to the large number of sprinkler heads usually connected to each secondary distribution pipe. Thus, the sprinkler heads of the system are divided into groups and each group contains sprinkler heads distributed substantially throughout the system. Selected groups of such sprinkler heads are successively operated so that at any one time a relatively small amount of water is flowing through any given secondary distribution pipe and, furthermore, the main distribution pipe may be reduced in size to a greater extent than in prior systems as the distance from the source increases. The savings due to the employment of smaller pipe are very much more than the cost of the valves.

The valve of the present invention is of simple construction made up largely of standard parts and contains a single moving member which has combined reciprocating and rotary motion. Each time the water pressure in the system is lowered below a predetermined pressure and then again raised above such predetermined pressure, such part is reciprocated first toward a valve closing position then toward a valve opening position. The member contains a pair of camming elements spaced in the direction of reciprocation of said member and each camming element has a plurality of camming surfaces for engaging a stationary member carried by the valve casing so that the movable member is rotated one step for each complete cycle of reciprocation. At one step only the movable member is allowed to move to valve opening position so as to cause operation of its associated sprinkler head, and by initially setting the valves of the system in accordance with a predetermined pattern, the results discussed above are obtained.

It is therefore an object of the present invention to provide an improved sprinkling system which can be controlled from the source of supply of water under pressure to cause selected groups of sprinkler heads distributed over the system to be operated successively in a repeating cycle.

Another object of the invention is to provide an irrigation system in which sprinkling by selected groups of sprinkler heads is controlled from a central point to cause such groups to operate in succession and in which the sprinkler heads operating at one time are distributed over the area to be irrigated in a manner enabling smaller pipes than heretofore considered necessary to be employed in the system.

Another object of the invention is to provide an improved pressure actuated valve progressed by repeated changes in water pressure through a repeating cycle having a plurality of steps in only one of which the valve is opened.

A further object of the invention is to provide an irrigation valve for use in an irrigation system which can be caused, by repeated stopping and starting the supply of water under pressure to the system, to progress through a repeating cycle including a plurality of steps, one only of which causes opening of the valve and in which a single movable member operates as both a control member having combined reciprocation and rotation and as a valve member to open and close a passage.

Other objects and advantages of the invention will appear in the following description of a preferred embodiment thereof shown in the attached drawing of which:

Figure 1:
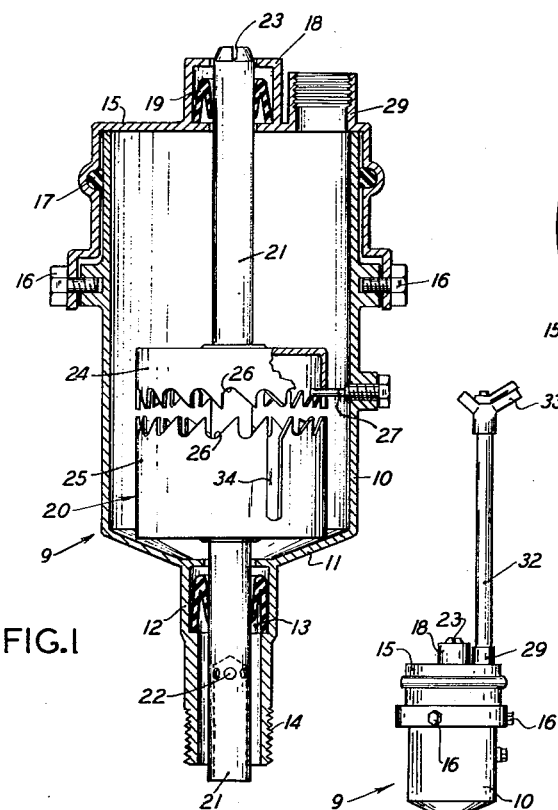
Fig. 1 is a vertical section of the valve of the present invention taken approximately on the line 1—1 of Fig. 2.
Figure 2:
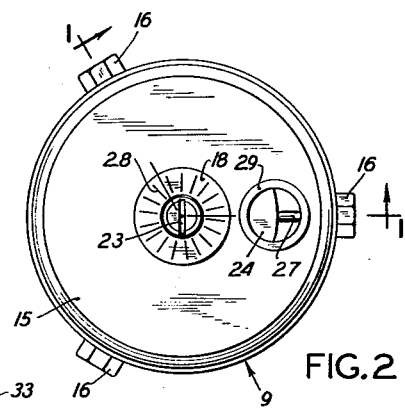
Fig. 2 is a plan view of the valve of the present invention.
Figure 3:
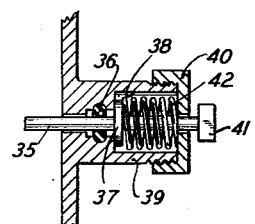
Fig. 3 is a side elevation on a smaller scale showing the valve connected to a secondary distribution pipe and sprinkler head.

Referring more particularly to the drawings, the valve 9 of the present invention includes a hollow, cylindrical body 10 having an integral bottom portion 11 provided with an axially downwardly extending tubular portion 12 concentric with the valve body 10. The tubular portion 12 has an internal annular groove adjacent the valve body for receiving a chevron type gasket 13 and has its outer end externally threaded at 14. The valve body 10 is provided with a cover 15 shown as being secured thereto by bolts 16 and being provided with an internal annular groove for receiving an O-ring gasket 17, although any other manner of securing the cover 15 to the valve body 10 in a leakproof manner can be employed. The cover 15 has a tubular portion 18 extending axially upwardly therefrom and provided with an internal annular groove for receiving a chevron gasket 19.

The valve includes a rotatable and reciprocable valve member 20 which has a central spindle member 21 extending axially thereof. The upper and lower ends of the spindle member 21 extend through and are engaged by the chevron gaskets 19 and 13, respectively, and are guided for rotary and reciprocatory motion in the cover 15 and in the bottom portion 11 of the body 10. The lower end of the spindle member 21 has an axially extending bore therein with a plurality of apertures 22 extending radially through its circumferential wall. The apertures 22 are positioned below the chevron gasket 13 except when the valve member 20 is in its uppermost position, as discussed in greater detail below. The upper end of the spindle member 21 has a screwdriver slot 23 in its exterior surface to enable the valve member 20 to be rotated manually in order to set the valve to a desired rotary position, as also discussed in greater detail below.

The valve member 20 includes a downwardly opening upper cup shaped member 24 and an upwardly opening lower cup shaped member 25, both such cup shaped members being suitably secured on the spindle member 21 so as to be concentric therewith. The rims of the cup shaped members 24 and 25 oppose each other to form a slot therebetween and their opposed edges bounding the slot are provided with a plurality of circumferentially disposed camming notches 26 positioned to cooperate with an inwardly extending stud 27 secured in the valve body 10. The inner end of the stud 27 extends into the slot between the cup members and the form of the camming notches 26 are such that a complete reciprocation of the valve member 20 from an upper position to the lower position shown and back to an upper position will index the valve member 20 through a rotary step having an annular distance equal to the annular distance between two of the camming notches 26 on the lower cup member 24.

The upper surface of the upwardly extending tubular portion 18 on the cover 15 is provided with circumferentially disposed indexed marks 28 corresponding to the cam notches 26 on the lower cup member 24 so that the position of the valve member 20 with respect to the valve casing is indicated by the relative position of the screwdriver slot 23 and the index marks 28 and also the cover is provided with an internally screw-threaded outlet pipe connection 29.

In the irrigation system of the present invention, each valve 9 has its lower tubular portion 12 connected to the top of a secondary distribution pipe 31 of an irrigation system and has a riser pipe 32 extending upwardly from the pipe connection 29 and carrying at its upper end a sprinkler head 33. Whenever there is a substantial amount of water pressure within the lateral 31, the valve member 20 is moved upwardly from the position shown in Fig. 1 by such water pressure so that the stud 27 rests in one of the notches 26 in the lower cup member 25. When the water pressure is removed from the lateral 31, the valve member 20 moves downwardly to its position shown in Fig. 1 and it will be apparent from Fig. 1 that each time this happens, the valve member will be indexed with a rotary motion about its axis one half of the angle between adjacent notches 26. When the water pressure is again applied, the valve member moves upwardly and is again rotated one half of such angle. When the stud 27 occupies a position within a notch 26 in the lower cup member 25, the holes 22 in the lower end of the spindle member 21 still remain below the chevron gasket 13. The lower cup member 25 is provided with a downwardly extending slot 34 which occupies a position corresponding to one of the notches 26 and when such slot reaches the position below the stud 27, upward movement of the valve member 20 is sufficient that the holes 22 in the lower end of the spindle member 21 are carried above the chevron gasket 13. This establishes communication through the valve between the pipe 31 and the riser 32 through the interior of the lower end of the spindle member 21, the apertures 22, the interior of the body member 10 and the pipe connection 29. When the water pressure is again lowered below a predetermined pressure and then again raised above such predetermined pressure, the valve member 20 is again reciprocated downwardly and then upwardly and indexed one step so that the stud 27 will again occupy a position in notch 26 of the lower cup member 25 and so that the sprinkler head 33 is again disconnected from the secondary distribution pipe 31. Thus, the valve of the present invention is progressed through a definite cycle having a plurality of steps, the valve being moved through one step each time the supply of water under pressure is stopped and again started. At one step only in the cycle, the valve causes operation of its associated sprinkler head by connecting such sprinkler head to its secondary distribution pipe 31.

The particular valve shown has 18 steps in its cycle, only one of which connects the sprinkler head 33 to the pipe 31. There are therefore 18 index marks 28 on top of the upwardly extending tubular portion 18 on the top of the valve body 10 and by removing the stud 27, the valve member 20 may be indexed in a circular direction by means of a screwdriver engaged in the slot 23 to initially set the valve to any desired position.

Figure 4:
Fig. 4 is a fragmentary vertical section showing a modification of the stud which cooperates with the camming surface of the valve member.

As shown in Fig. 4, a modified form of structure may include a spring pressed stud or plunger 35 extending inwardly through the wall of the valve casing and having an O-ring gasket 36 for preventing leakage of water. The stud 35 may have a collar 37 intermediate its ends positioned in a cylindrical bore 38 in a boss 39 extending outwardly from the wall of the valve chamber. The bore 38 may have a cover member 40 suitably secured thereto through which the outer end of the stud 35 extends, the stud 35 terminating at its outer end in a head portion 41. A compression spring 42 is positioned within the bore 38 between the cover member 40 and the collar 37 to urge the stud 35 inwardly into the body portion of the valve chamber and into engagement with the camming surfaces upon the cup members 24 and 25. It will be apparent that the stud 35 of Fig. 4 may be pulled outwardly at any time to enable the valve member 20 to be rotatably indexed by a screwdriver engaged in the slot 23. Upon release of the stud, the spring 42 reengages the stud in the notches of the valve member. It will be appreciated that the above discussed adjustments of the valve member are made when there is no water pressure on the system but if it becomes necessary to adjust a valve member with water pressure on the system, it is possible, if the water pressure is not too high, to depress the valve member 20 sufficiently with the screwdriver against the water pressure to rotate it without withdrawing the stud 27 or 35.

Figure 5:
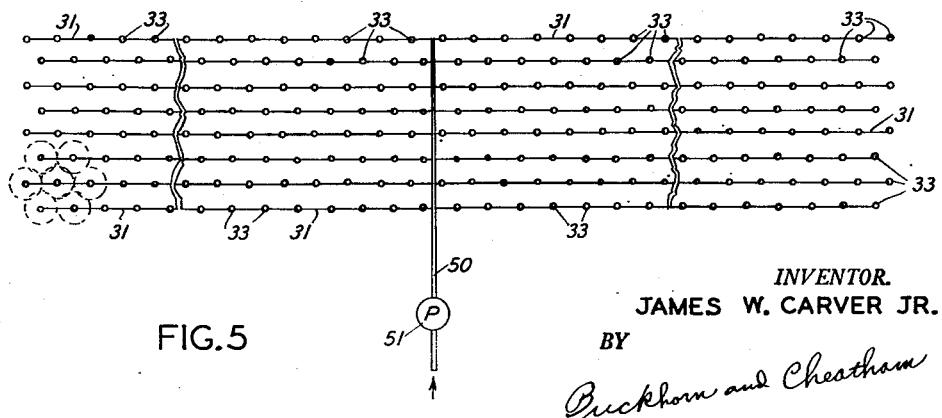
Fig. 5 is a diagrammatic plan view of an irrigation system in accordance with the present invention.

A specific example of a large scale irrigation system is indicated in Fig. 5. Such a system, for example, may have a main distribution pipe 50 supplied with water under pressure from a pump 51 and a plurality of secondary distribution pipes or laterals 31 connected to the main distribution pipe 50. In the example of Fig. 5, 16 laterals 31 are shown, although a much greater number may be employed, and each lateral is assumed to have thirty-six sprinkler heads 33 spaced therealong, each sprinkler head being forty feet from its next adjacent sprinkler head and the laterals being forty feet apart. That is to say, the laterals may each be approximately fourteen hundred feet long. Previous systems have had manually operable valves in each lateral adjacent the main distribution pipe 50 and it has been the practice to manually open the valves of selective laterals so that all sprinkler heads connected to a given lateral operate at the same time. Such a system requires large size laterals as each lateral is required to supply water to all thirty-six sprinkler heads on the lateral at the same time and also the main distribution pipe to even the most remote lateral of the system must be of sufficient size to supply all sprinkler heads on such lateral.

In the present system, each sprinkler head has one of the valves of Figs. 1 to 4 associated with each sprinkler head. In the specific example given, the valves are set so that two sprinkler heads only on each lateral operate at the same time and every time the pump is stopped and again started, two other sprinkler heads on each lateral take over the sprinkling operation. For the operation just described, each lateral need only be big enough to supply two sprinkler heads at the same time instead of thirty-six sprinkler heads and, in fact, the system can be operated so that the half of a lateral which is furthest from the main 50 can be of a size sufficient to supply one sprinkler head only. This is accomplished by setting the valves so that the sprinkler heads operating on a given lateral at any one time are always on separate halves of the lateral. The savings in cost in the size of the laterals is very much greater than the cost of an indexing valve for each sprinkler head. Also considerable saving in labor results from the fact that the entire sprinkling operation can be carried out by merely starting and stopping the pump or otherwise discontinuing and again reestablishing the supply of water under pressure to the system at desired time intervals as it is not necessary for an operator to make extended trips into the field to vary the operation of the sprinkler heads. A further advantage of the system is that the main distribution pipe 50 may become progressively smaller as its distance from the source of supply increases, since a small number only of sprinkling heads on the most remote laterals are operated at one time, whereas in prior systems, all of the sprinkler heads on even a remote lateral are operated simultaneously. In general, in the present system, the number of sprinkler heads which are mounted on a given secondary distribution pipe will be equal to the number of steps in the cycle of the remote control valves employed, or a multiple of such number of steps, and the number of sprinkler heads on each secondary distribution pipe which operate at one time will be equal to the total number of heads on such pipe divided by the number of steps in such cycle.

While I have illustrated and described preferred embodiments, it is to be understood that the details of the invention may be varied and the invention is to be limited only by the scope of the following claims.

I claim:

1. An irrigation system comprising a main pipe connected to a source of water under pressure, a plurality of secondary pipes connected to said main pipe and extending in spaced relation over an area to be irrigated, each of said secondary pipes having a plurality of sprinkler heads spaced therealong, a valve between each of said sprinkler heads and its associated secondary pipe including a member movable through a plurality of successive positions in a repeating cycle, said member being actuated by water pressure to move from one of said positions to a succeeding position each time the water pressure in said system is reduced and again increased and said valve being opened to connect said sprinkling head to said associated secondary pipe in one only of said positions of said cycle, said cycle of each of said valves of each of said secondary pipes being set to provide for spraying at one time from a predetermined number only of said sprinkling heads associated with each secondary pipe.

2. An irrigation system comprising a main pipe connected to a source of water under pressure, a plurality of secondary pipes connected to said main pipe and extending in spaced relation over an area to be irrigated, each of said secondary pipes having a plurality of sprinkler heads spaced therealong, a valve between each of said sprinkler heads and its associated secondary pipe including a member movable through a plurality of successive positions in a repeating cycle, said member being actuated by water pressure to move from one of said positions to a succeeding position each time the pressure in said system adjacent said valve is reduced and again increased and said valve being opened to connect said sprinkler head to said associated secondary pipe in one only of said positions of said cycle, said cycle of each of said valves of each of said secondary pipes being set to provide for spraying at one time from a predetermined number only of said sprinkling heads associated with each secondary pipe, said secondary pipes being of a size sufficient to supply water to said predetermined number of sprinkler heads only.

3. An irrigation system comprising a main distribution pipe connected to a source of water under pressure, a plurality of secondary distribution pipes connected to said main pipe, each of said secondary pipes having a plurality of sprinkler heads spaced therealong, a valve between each of said sprinkler heads and its associated secondary pipe and having a member actuated through a step in a multistep repeating cycle by a decrease in water pressure in said system followed by an increase in water pressure, said valve being opened to connect the sprinkler head to its associated secondary pipe at one step only in said cycle, the valves associated with each secondary pipe being set to provide for spraying at one time from a predetermined number only of sprinkling heads associated with said secondary pipe.

4. An irrigation system comprising a main distribution pipe connected to a source of water under pressure, a plurality of secondary distribution pipes connected to said main pipe, each of said secondary pipes having a plurality of sprinkler heads spaced therealong, a valve between each of said sprinkler heads and its associated secondary pipe and having a single movable member supported for rotation and being actuated through a rotary step in a multistep repeating cycle by a decrease in water pressure in said system followed by an increase in said water pressure, said valve being opened to connect the sprinkler head to its associated secondary pipe at one step only in said cycle, the valves associated with each secondary pipe being set to provide for spraying at one time from a predetermined number only of sprinkling heads associated with said secondary pipe.

5. An irrigation system comprising a main distribution pipe connected to a source of water under pressure, a plurality of secondary distribution pipes connected to said main pipe, each of said secondary pipes having a plurality of sprinkler heads spaced therealong, a valve between each of said sprinkler heads and its associated secondary pipe and having a member actuated through a step in a multi-repeating cycle by a decrease in water pressure in said system followed by an increase in water pressure, said valve being opened to connect the sprinkler head to its associated secondary pipe at one step only in said cycle, the valves associated with each secondary pipe being set to provide for spraying at one time from a predetermined number only of sprinkling heads associated with said secondary pipe, said valve including a valve casing and a valve member mounted in said casing for rotation and reciprocation, said member having a piston area exposed to said pressure to provide for reciprocation of said member from a valve open position toward a valve closed position when the pressure in said system decreases below a predetermined pressure and for reciprocation back toward said valve open position when the pressure in said system rises above said predetermined pressure, said member having axially spaced circular portions each having a plurality of camming surfaces circumferentially spaced thereon, said camming surfaces on one of said circular portions being in opposed and alternating relation to said camming surfaces on the other of said circular portions, a stationary member carried by said casing and engaged successively by an opposed pair of said camming surfaces to cause a partial rotation of said member when said member is reciprocated, and engaged by one of said axially spaced portions to hold said valve member in valve closed position, said one axially spaced portion having an axial slot therein at one circumferential position enabling said member to move to said valve open position.

6. A valve for an irrigation system including a valve casing, a valve member mounted in said casing for rotation and reciprocation and having a piston area exposed to water pressure to provide for reciprocating of said member from a valve open position toward a valve closed position when said pressure decreases below a predetermined pressure and for reciprocation back toward said valve open position when said pressure increases above said predetermined pressure, said member having axially spaced circular portions each having a plurality of camming surfaces circumferentially spaced thereon, said camming surfaces on one of said circular portions being in opposed and alternating relation to said camming surfaces on the other of said circular portions, a stationary element carried by said casing and engaged successively by an opposed pair of said camming surfaces to cause a partial rotation of said member when said member is reciprocated, and engaged by one of said axially spaced portions to hold said valve member in valve closed position, said one axially spaced portion having an axial slot therein at one circumferential position enabling said member to move to valve open position.

7. A valve for an irrigation system including a valve casing, a valve member mounted in said casing for rotation and reciprocation and having a piston area exposed to water pressure to provide for reciprocating of said member from a valve open position toward a valve closed position when said pressure decreases below a predetermined pressure and for reciprocation back toward said valve open position when said pressure increases above a predetermined pressure, said member having a central spindle member and upper and lower circular elements secured to said spindle member and each having a plurality of camming surfaces circumferentially spaced thereon, said camming surfaces on one of said circular portions being in opposed and alternating relation to said camming surfaces on the other of said circular portions, a stationary element carried by said casing and engaged successively by an opposed pair of said camming surfaces to cause a partial rotation of said member when said member is reciprocated, and engaged by said lower circular element to hold said valve member in valve closed position, the lower end of said spindle member being open and having a plurality of radially extending apertures in its wall, a gasket surrounding said lower end of said spindle member and said apertures being below said gasket when said valve member is in valve closed position, and said lower element having an axially extending slot therein at one circumferential position enabling said spindle member to move upwardly to move said apertures past said gasket so as to permit the flow of water through said valve casing.

8. The structure set forth in claim 7 wherein said stationary element comprises a stud mounted in said valve casing and projecting radially inwardly therefrom with respect to said circular elements, said stud being withdrawable from engagement with said camming surfaces to permit indexing of said camming surfaces to a predetermined setting.

9. The structure set forth in claim 7 wherein said stationary element comprises a movable member mounted in the wall of said casing and projecting radially inwardly therefrom with respect to said circular elements and being withdrawable from engagement with said camming surfaces to permit indexing of said camming surfaces to a predetermined setting, and wherein the upper end of said spindle member projects from said casing whereby said camming surfaces may be indexed.

References Cited in the file of this patent

UNITED STATES PATENTS

| | | |
|---|---|---|
| 1,326,046 | Goodhue | Dec. 23, 1919 |
| 2,197,685 | Cunningham | Apr. 16, 1940 |
| 2,341,041 | Hauser | Feb. 8, 1944 |
| 2,360,321 | Griswold | Oct. 17, 1944 |
| 2,666,450 | Berry | Jan. 19, 1954 |
| 2,685,884 | Heckendorf | Aug. 10, 1954 |